United States Patent
Knestel et al.

(10) Patent No.: US 9,146,174 B2
(45) Date of Patent: Sep. 29, 2015

(54) APPARATUS FOR DETERMINING FORCES AND MOMENTS ACTING ON MOTOR VEHICLES IN A WIND TUNNEL

(75) Inventors: Anton Knestel, Hopferbach (DE); Christian Hartmann, Altusried (DE)

(73) Assignee: MAHA-AIP GMBH & CO. KG, Haldenwang (DE)

(*) Notice: Subject to any disclaimer, the term of this patent is extended or adjusted under 35 U.S.C. 154(b) by 117 days.

(21) Appl. No.: 13/988,135

(22) PCT Filed: Nov. 16, 2011

(86) PCT No.: PCT/EP2011/005766
§ 371 (c)(1),
(2), (4) Date: Aug. 7, 2013

(87) PCT Pub. No.: WO2012/065723
PCT Pub. Date: May 24, 2012

(65) Prior Publication Data
US 2013/0312508 A1   Nov. 28, 2013

(30) Foreign Application Priority Data
Nov. 17, 2010   (DE) .......................... 10 2010 044 058

(51) Int. Cl.
*G01B 5/30* (2006.01)
*G01M 9/06* (2006.01)
(Continued)

(52) U.S. Cl.
CPC ................ *G01M 9/062* (2013.01); *G01M 9/04* (2013.01); *G01M 17/0074* (2013.01)

(58) Field of Classification Search
CPC ............. G01B 5/30; G01M 9/04; G01M 9/06
USPC .......................................................... 73/760
See application file for complete search history.

(56) References Cited

U.S. PATENT DOCUMENTS 3,625,344 A * 12/1971 Debeaux ........................ 198/813
3,886,788 A    6/1975 Jeter, Jr.
3,914,990 A   10/1975 Borg
(Continued)

FOREIGN PATENT DOCUMENTS

DE       195 05 533 A1   8/1996
DE       197 02 421 A1   8/1998
(Continued)

OTHER PUBLICATIONS

May 4, 2012 International Search Report issued in International Application No. PCT/EP2011/005766 (with translation).
(Continued)

*Primary Examiner* — Lisa Caputo
*Assistant Examiner* — Octavia Hollington
(74) *Attorney, Agent, or Firm* — Oliff PLC (57) ABSTRACT

The invention relates to a belt unit in a wind tunnel balance for motor vehicles, in particular for determining forces and moments acting on a motor vehicle in a wind tunnel, wherein an area exposed to wind is minimized by means of a trapezoidal support, which is raised with respect to a normal zero position, and appropriately adapted test stand covers. The wind-exposed area of the endless belt of the belt test stand can be reduced here to a value which is only slightly above the necessary wheel contact area (tire shuffle). As a result, error forces can be reduced further, so that the result is highly increased measurement accuracy.

17 Claims, 6 Drawing Sheets

(51) Int. Cl.
*G01M 9/04* (2006.01)
*G01M 17/007* (2006.01)

(56) References Cited

U.S. PATENT DOCUMENTS

| | | |
|---|---|---|
| 4,991,430 A | 2/1991 | Kaizu |
| 4,998,436 A | 3/1991 | Kaizu et al. |
| 5,136,879 A * | 8/1992 | Kaizu et al. ................ 73/116.07 |
| 5,241,854 A * | 9/1993 | Kaizu et al. ................ 73/116.07 |

FOREIGN PATENT DOCUMENTS

| | | |
|---|---|---|
| DE | 10 2005 031 446 A1 | 1/2007 |
| DE | 10 2008 019 699 A1 | 10/2009 |
| DE | 10 2008 036 315 A1 | 1/2010 |
| EP | 1 544 589 A2 | 6/2005 |

OTHER PUBLICATIONS

Jul. 8, 2013 Office Action issued in German Application No. DE 10 2010 044 058.2 (with partial translation).

* cited by examiner

APPARATUS FOR DETERMINING FORCES AND MOMENTS ACTING ON MOTOR VEHICLES IN A WIND TUNNEL

The invention relates to a belt unit in a wind tunnel balance having a conveyor belt system for motor vehicles, in particular for determining forces and moments acting on a motor vehicle in a wind tunnel, wherein an area exposed to wind is minimized by means of a trapezoidal support, which is raised with respect to a normal zero position, and appropriately adapted test stand covers. The wind-exposed area of the endless belt of the belt test stand can be reduced here to a value which is only slightly above in the direction of the necessary wheel contact area (tire shuffle). As a result, error forces can be reduced further so as to achieve a highly increased measurement accuracy of the wind tunnel balance having a conveyor belt system and/or of a belt test stand using the wind tunnel balance.

BACKGROUND

DE 10 2008 019 699 A1 discloses e.g. a belt test stand for motor vehicles, which includes a belt unit having a first drum and a second drum. One of these drums is driven and the other one is carried along via the endless belt. A hydraulic cylinder is arranged between the drums and increases or decreases the distance between the driving drum and the idler drum depending on the moving direction of the piston so as to correspondingly increase or decrease the pretension of the endless belt. It is also shown that one of the drums is fixedly arranged in the belt running direction and the other drum is movably mounted. In addition, a support is shown the top side of which is provided between the drums. The top side of the support is arranged here in alignment with a tangential connecting line of the top side of the drums.

DE 197 02 421C2 describes a test stand for determining forces and moments acting on a motor vehicle or on components thereof, wherein a wheel belt unit is mounted on a weighbridge. The threshold support also rests on the weighbridge. However, a recess in the non-weighed base plate is chosen to be relatively great, and therefore the area for generating error forces is relatively large.

A drawback of the above mentioned prior art is that the belt test stand area exposed to the air current is relatively large, and therefore error forces are measured by the test stand.

In order to optimize the aerodynamic properties of a motor vehicle, the motor vehicles are exposed to real wind conditions in what is called a wind tunnel. It is here of utmost significance that all current conditions around the car body and at the underbody are reproduced as realistically as possible.

This is why the vehicle is not placed on otherwise common roller type test stands but on what is called flat belt units (belt test stands) since the latter permit a level insertion in the base plate.

What is called a center conveyor belt can be inserted here in the center of the test apparatus and is usually operated at a same speed as that of the air current. As a result, realistic pressure conditions occur at the underbody of the motor vehicle. During an incoming fluid flow, the vehicle forces must be measured via "X" (from the front) and via "Y" (from the side) and the lifting force "Z". The lifting force is understood to mean here the difference between the normal weight force without an incoming flow and the weight force with the incoming flow. In accordance with the three forces in the X-, Y- and Z-directions, it is also possible to suitably determine three moments in the X-, Y- and Z-directions by including the lever arms, and therefore such an apparatus is referred to as a 6-component balance.

Since the vehicle would be pushed off the belt units by the X-forces occurring, it is necessary to hold the vehicle via beam supports (so-called rocker panels). Here, the four wheel belt units and the four threshold supports are mounted on the weighing frame. All the other parts of the platform are connected to the non-weighted test stand design.

In a model case, the belt contact area which is visible from above is as large as the tire shuffle of the respective wheels of the motor vehicle to be tested. Of course, this can only be achieved theoretically. In practice, the wheel belt units are markedly greater than the tire shuffle. As a result, parts of the wheel belt unit and thus of the wind tunnel balance are exposed to the resulting flow conditions at and/or under the vehicle. In accordance with the resulting pressure condition and the exposed area, error forces are formed and add up to the actual lifting force and/or downforce.

SUMMARY

It is an object of the invention to create a belt test stand for motor vehicles, in particular for determining forces and moments acting on a motor vehicle in a wind tunnel, said test stand enabling an improved measuring accuracy.

The object is achieved by a belt unit and/or an apparatus, in particular for determining forces and moments acting on a motor vehicle in a wind tunnel according to the features of independent claim 1. The dependent claims relate to advantageous embodiments of the invention.

The object can be realized by arranging a support which supports the endless belt and is arranged below a carrying run of the endless belt between the first and second drums, by a predetermined distance AL above an upper tangential connecting line of the drum outer surfaces. The wind-exposed area of the belt test stand and/or the endless belt can be minimized by raising the support above the normal zero position since the end regions of the test stand cover (edges), which are assigned to the support, can be provided over or above the respective drum and thus closer to the support. The end regions of the test stand cover, which are assigned to the support, can be located within a region which is formed by the axes of rotation of the drums. The belt test stand area exposed to the wind flow is substantially determined by the support region which is not covered by the test stand cover. This region can be minimized by the solution according to the invention and therefore can be reduced towards the resulting tire shuffle.

This leads to the above mentioned advantages, namely that the exposed area is minimized and the resulting error forces are reduced. Therefore, the wind tunnel balance used in the wind tunnel and/or the belt unit can detect even more accurate and more precise measured values.

The top side of the support can have an outwardly curved shape. As a result, it is possible to minimize the area exposed to the current since the test stand cover can thus move closer to the necessary tire contact area formed on the top side of the support.

The support can be what is called a trapezoidal support, at least part of which consists of a porous material and to which a fluid, preferably air, is applied. Since the support is designed as an air bearing, the friction between the endless belt and the support is strongly reduced. This increases the accuracy of the measured results concerning the forces of the vehicle wheel that act in the travel direction.

The top side of the support can have two slanted first regions and a flat, straight second region which is arranged between the first regions. The test stand cover ends which face the support can move closer to the straight second region so as to minimize the endless belt area exposed to the air current.

The radius of the transition between the first regions and the second region can be greater than or equal to the minimum allowable bending radius of the endless belt. The radius of the transition can be greater than or equal to the radius of the drums. Such a design of the transition can ensure that the fatigue strength of the endless belt, preferably a steel belt, is preserved since its bending radius does not fall below an admissible value.

It is pointed out expressly here that the two slanted first regions having a certain radius can border on the second region, wherein the radius can extend to the outer end of the first regions. This radius can also cover the contour starting from the transition to the end of the first region. The radius can also change here into a flat portion and/or be changed in any other way.

The flat second region of the support can be arranged substantially parallel to the upper tangential connecting line of the drum outer surfaces. It is thus ensured that the endless belt runs symmetrically off the support.

The support can also have an bottom side having first and second radii, wherein the radii are equal to or greater than the radius of the drums. Such a design of the bottom side of the support can ensure the optimized positioning of the support between or above the drums, on the one hand, and minimize the generation of flow turbulences, on the other hand.

Furthermore, the test stand cover can have a wedge-shaped end region at a side facing the support or the free region of the endless belt. This so-called "Brillenmesser" (cover blade) can have a top side which is arranged parallel to the top side of the support. The top side of the test stand cover can here be arranged at a height which is higher by the thickness of the endless belt DB compared to the top side of the support as such. As a result, it can be ensured that the area from the test stand cover to the endless belt running on the support and back to the test stand cover is flush. The resulting turbulences and error forces can thus be substantially minimized. The cover blade also contributes thereto; the bottom side of said rest has a shape congruent to the slanted first region of the support in the end region of the respective test stand cover. In this connection, a distance between the inner face and/or the tip of the wedge-shaped end region of the test stand cover of 1 to 2 mm from the endless belt is possible, for example, depending on the tolerances to be observed. As to the minimum radii of the transition and/or the minimum radii of the slanted first regions, a drum having a diameter of 280 mm can have a minimum radius of 140 mm, for example. The thickness of the endless belt can here be 0.3 mm, for example.

Due to the inventive provision of the support raised relative to the upper tangential connecting line of the drum outer surfaces and alternatively or additionally to the corresponding shape of the slanted first regions and alternatively or additionally in connection with a test stand cover with end regions having undersurfaces which extend in substantially congruent fashion relative to the slanted first region of the support, it is possible to achieve a high-precision detection of forces and/or moments upon a use in the wind tunnel. This results inter alia from the considerable minimization of the endless belt area exposed to the air current, wherein the size and shape of this area can be strongly approached to the resulting tire shuffle. Furthermore, these advantages result from the possibility of substantially reducing all interfering currents and/or turbulences since the end regions of the test stand cover can be moved very closely, and congruently on the inside, to the outer end regions of the top side of the support.

BRIEF DESCRIPTION OF THE DRAWINGS

Embodiments of the invention are specified below by way of example on the basis of schematic figures, wherein.

DETAILED DESCRIPTION OF THE EMBODIMENTS

Figure 1:
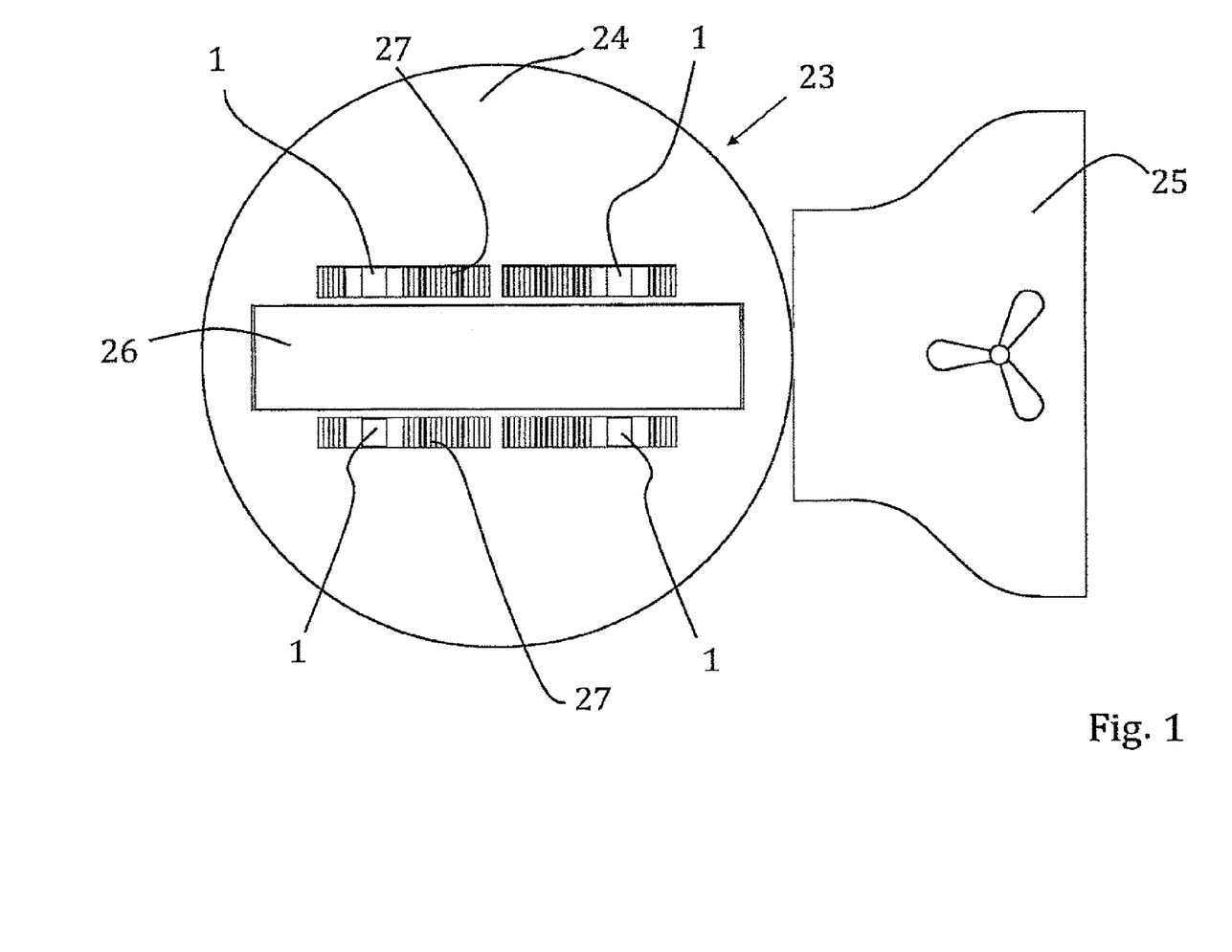
FIG. 1 shows a schematic top view of an overall test stand.

FIG. 1 shows an overall test stand 23 from above. A round base plate 24 can be rotated e.g. by +/−185° relative to an air nozzle 25 to enable an incoming flow to a motor vehicle (not shown) resting on belt units 1 from all sides.

Furthermore, a center belt 26 is arranged below the vehicle. This center belt 26 can be driven to further optimize the test situation of the motor vehicle. The four belt units 1 shown can be adjustable, at least in the travel direction, to preselect corresponding vehicle axle distances. The thus released spaces can be covered via blinds or corresponding inserts 27.

Figure 2:
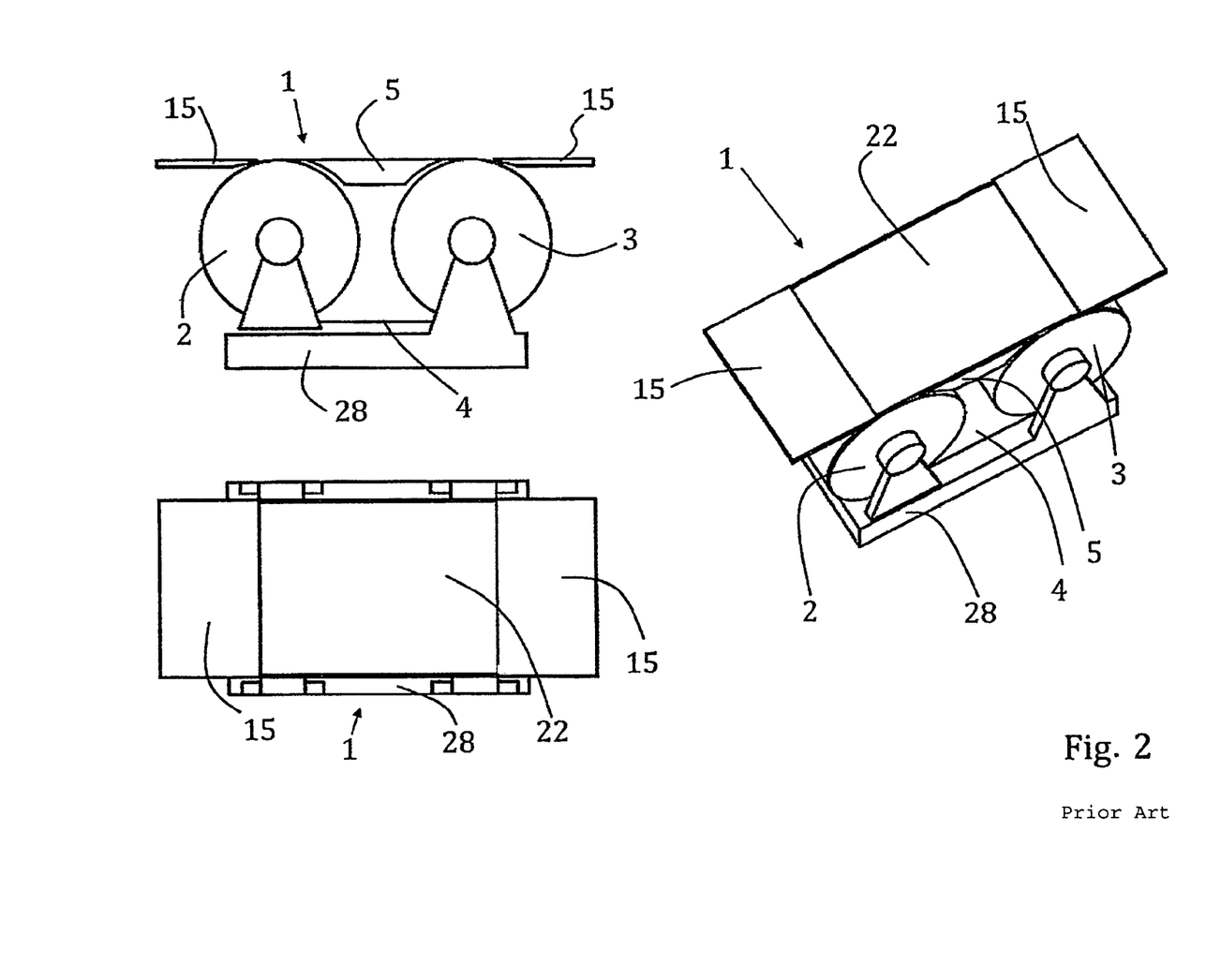
FIG. 2 shows schematic views of a belt unit according to the prior art.

FIG. 2 shows various views of the belt unit 1 and illustrates a prior art design. This figure shows a first drum 2 and a second drum 3, which carry and drive or decelerate an endless belt 4. A free area 22 of the endless belt 4 is supported by a support 5 in such a way that, even under the influence of a force by a vehicle wheel, the endless belt 4 forms an area plane for the wheel.

The two drums 2, 3 are mounted on a weighing frame 28. Furthermore, a test stand cover 15 is provided which is tangent to the endless belt 4 and/or the drums 2, 3, i.e. the test stand cover 15 is arranged so as to form an overall plane area (surface of the test stand cover 15—surface of the endless belt 4—surface of the test stand cover 15). However, the area of the endless belt 4, which is exposed to wind, is here substantially greater than the usable area above the support 5. This results in error forces since the test stand area exposed to the current is larger than absolutely necessary.

Figure 3:
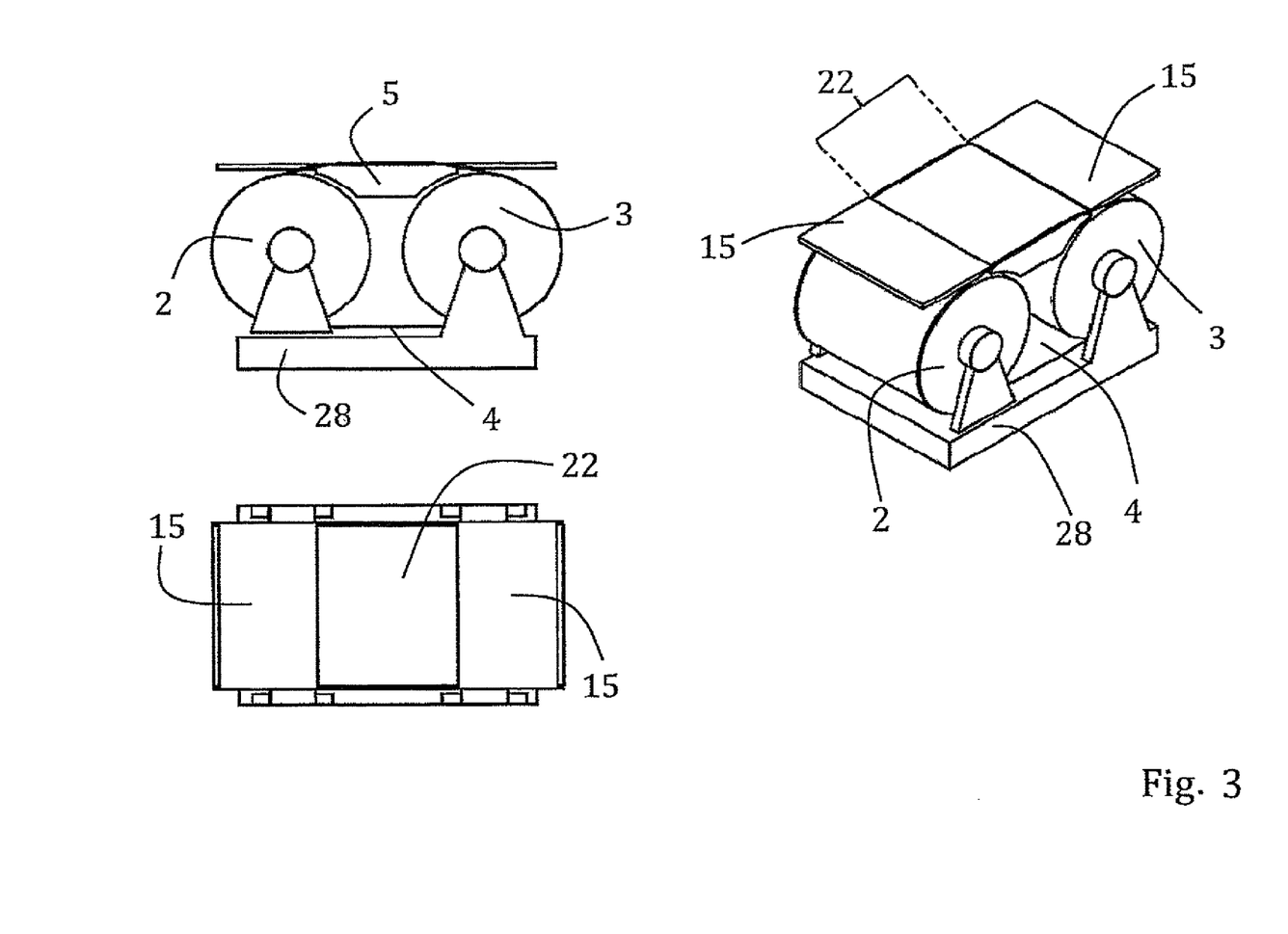
FIG. 3 shows schematic views of a belt unit according to the invention.

FIG. 3 shows a belt unit 1 according to the invention, wherein the area exposed to the current (free area 22) is substantially smaller compared to the prior art (FIG. 2). This can be achieved by using a raised support 5 (trapezoidal support).

Figure 3A:
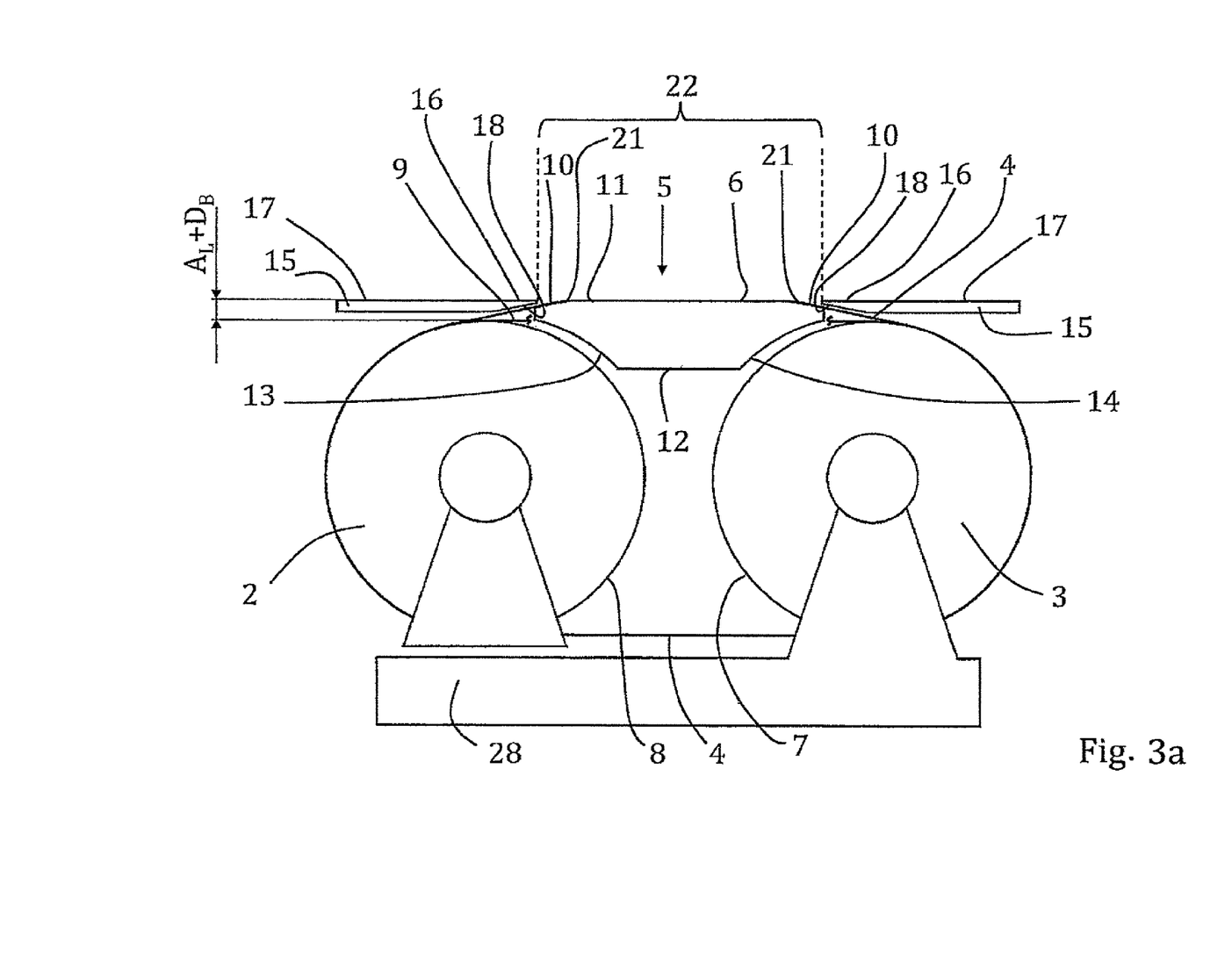
FIG. 3a shows an enlarged schematic view of the belt unit shown in FIG. 3.

FIG. 3a shows a schematic side view of the belt unit 1 according to the invention. A top side 6 of the support 5 is arranged in such a way that it is arranged by a predetermined distance AL above an upper tangential connecting line 9 from the drum outer surfaces 7, 8.

The endless belt 4 runs over the top side 6 of the support 5, resulting in an overall distance of the top side 6 of the support 5 with an endless belt 4 running thereon of AL+DB (DB=thickness of the endless belt 4). The test stand covers 15 arranged on the right and left hand sides of the support 5 have a surface 17 which is flush with the top side 6 of the support 5 with an endless belt 4 arranged thereon. This means that the surface 17 of the test stand cover 15 is disposed substantially in a plane with the surface of the endless belt 4 which runs or rests on the top side of the support 6 and/or on a flat second region 11 of the support 5.

A wedge-shaped end region 16 of the test stand cover 15, the so-called "Brillenmesser" (cover blade), can here have an undersurface 18 which extends in a substantially congruent fashion with the respective slanted first region 10 of the support 5. Due to an adaptation of the undersurface 18 of the test stand cover 15 to the slanted respective first region 10 of the support 5, the resulting gap between the top side of the endless belt 4 and the undersurface 18 of the test stand cover 15 can be minimized. As a result, air turbulences and resulting interferences of the measurement process can be further minimized. Furthermore, it is possible as a result of the development of the wedge-shaped end region 16 (cover blade) to arrange the test stand cover 15 even more closely to the contact area (second region 11) of the support 5, and therefore the interferences resulting from the current influences can be further minimized. A transition 21 is provided between the slanted first regions 10, provided on the right- and left hand sides of the support 5 and the flat second region 11. The radius of the transition 21 can here be greater than or equal to the minimum allowable bending radius of the endless belt 4. The radius of the transition can also be chosen on the basis of the radius of the drums 2, 3, wherein the radius should be chosen so as to be at least equal to the radius of the drums 2, 3. The above selection of the minimum radius ensures that the bending load of the endless belt 4 does not exceed the allowable value, which might possibly reduce the fatigue strength.

The first regions 10 arranged on the right and left hand sides of the second region 11 of the support 5 can have a flat region following the transition 21. However, it is also conceivable for the slanted first regions 10 to be shaped differently with respect to each other on the right and left hand sides, irrespective of whether the slanted first regions 10 are made equally or differently with respect to each other, they can also be provided on the whole with a certain radius; it is also conceivable to provide partial regions which have a straight surface and partial regions which have a corresponding radius. The provided radii can have a convex shape on the whole. The provided radii can yield a convex shape on the whole. Depending on certain conditions, other shapes or surface contours of the first regions 10 might also be conceivable.

The support 5 can also have a bottom side 12 which extends at least partially parallel to the top side 6 of the support. On the right-hand and left-hand sides bordering on the bottom side 12 of the support 5, it is possible to provide first and second radii 13, 14, wherein said radii can be equal to or greater than the respective radii of the drums 2, 3. The provision of the radii 13, 14 in the chosen shape, i.e. equal to or somewhat larger than the radius of the respective drums 2, 3, serves for complying with the formal requirements for the support 5, on the one hand, and for achieving an abutment of the shape to the outer surface of the drums 2, 3, on the other hand. As a result, air turbulences can be reduced to a minimum, which in turn adds to the measurement accuracy of the apparatus. The transition area between the outer ends of the radii 13, 14 and the respective outer ends of the first regions 10 can be made by means of straight end surfaces 29 (see FIG. 3b) which can be arranged horizontally.

In this example, the weighing frame 28 is fixedly attached to a holder of the drum 3, wherein the drum 2 is movably mounted in the travel direction of the endless belt 4. As a result, a desired pretension can be exerted on the endless belt 4 by means of a hydraulic cylinder (not shown), wherein the hydraulic cylinder (not shown) rests on the weighing frame 28, on the one hand, and is connected to a holder of the drum 2, on the other hand.

Furthermore, a distance AL+DB is shown which corresponds to the distance between the upper tangential connecting line 9 of the drum outer surfaces 7, 8 and the surface 17 of the test stand cover 15 and/or the distance between the upper tangential connecting line 9 of the drum outer surfaces 7, 8 and the top side of the endless belt 4 which rests or extends on the flat second region 11.

Figure 3B:
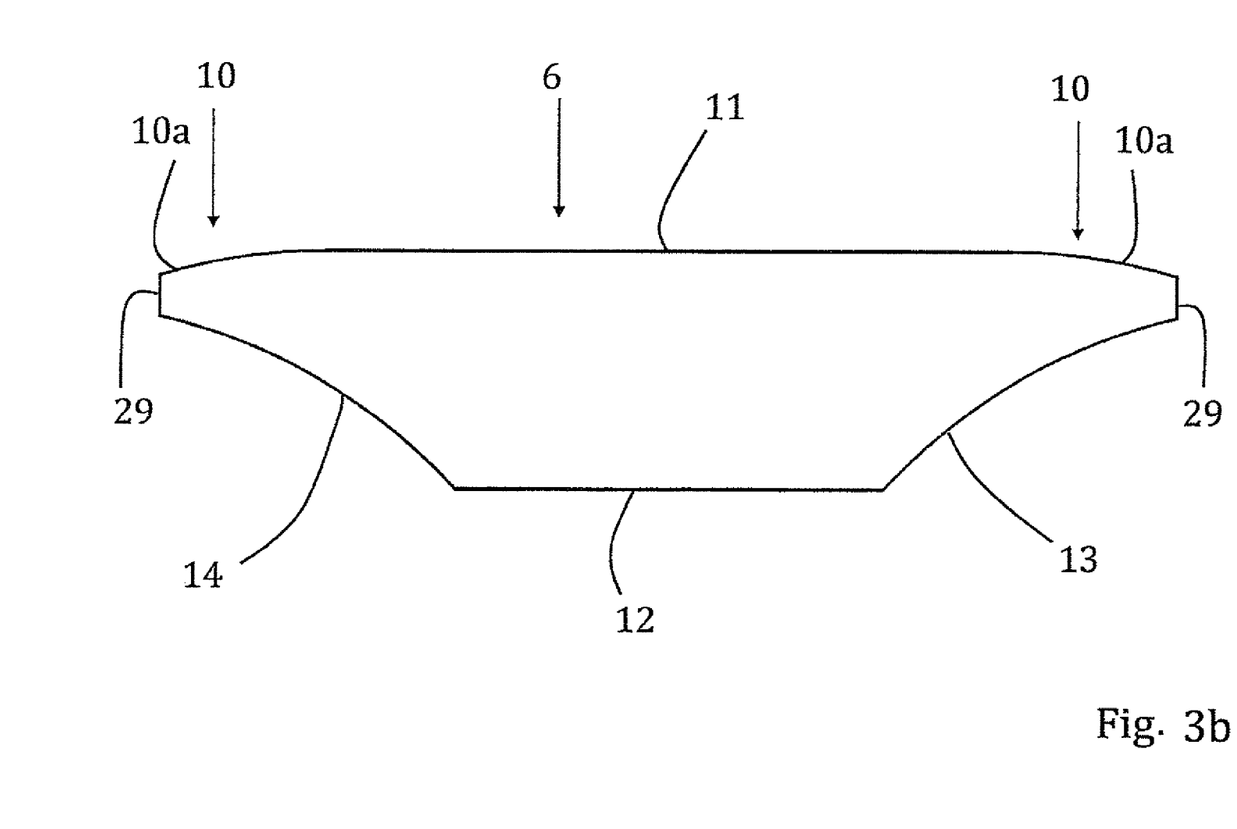
FIG. 3b shows a view of the support.

FIG. 3b shows an enlarged view of the support 5 with the slanted first regions 10 and the flat second region 11. The transition 21 between the flat second region 11 and the slanted first region 10 can be realized in smooth fashion, wherein, as already mentioned above, the slanted first regions 10 can have different shapes, wherein e.g. an overall round shape is possible which can have a constant radius. In the embodiment as shown, which is only an example, the flat second region 11 extends into the respective transition 21 and then into the slanted respective first region 10, wherein the slanted first region 10 has a straight area 10a. The vertical area 29 is provided in the respective right-hand and left-hand end regions of the support 5 and, in turn, changes into the radii 13, 14, followed by the bottom side 12. As already explained above, the bottom side 12 can be made parallel to the top side 6 of the support 5, i.e. parallel to the second region 11 of the top side 6.

Figure 4:
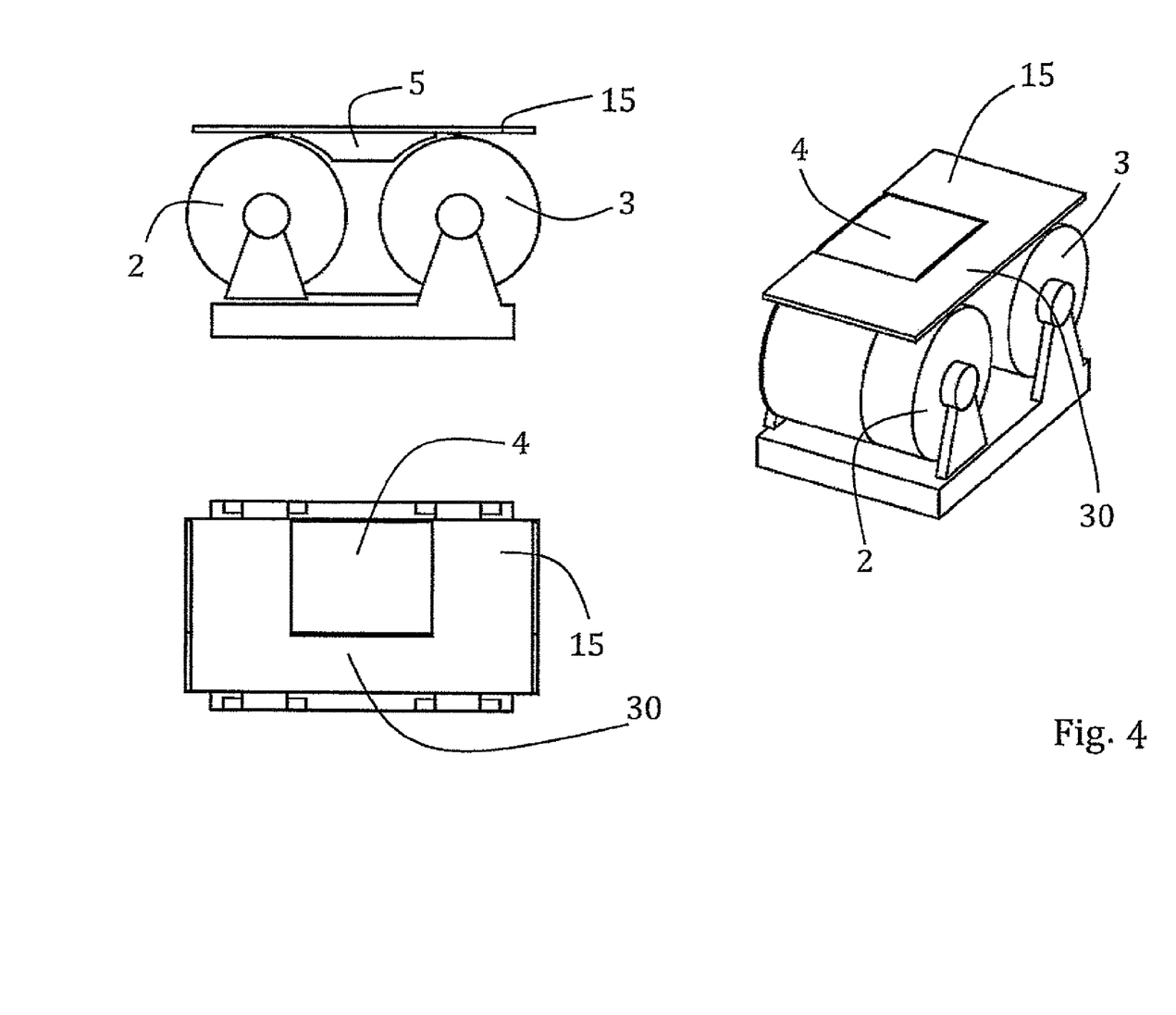
FIG. 4 shows schematic views of a belt unit with a trapezoidal support which has a smaller width than the respective drums.

FIG. 4 shows an embodiment where the belt test stand can be used for narrow vehicle wheels and for vehicle wheels which have a smaller width compared to the drum width. For this purpose, a narrow endless belt 4 is placed on the drums 2, 3, it being possible as a result of the raised position of the support 5 to partially design the test stand cover 15 continuously (continuous region 30). It is thus possible to keep interfering lifting forces and downforces away from the weighed part in optimum fashion.

According to the invention it is thus possible to provide a belt unit, in particular for use in wind tunnels, which contributes to increasing the measuring accuracy in connection with an underground balance since the areas which are exposed to the wind flow can be greatly minimized.

The invention claimed is:

1. A belt unit for motor vehicles, in particular for determining forces and moments acting on a motor vehicle in a wind tunnel, comprising
at least one belt unit which has a first drum and a second drum, wherein an endless belt is wrapped around the first and second drums, and
a support which supports the endless belt and is arranged below a carrying run of the endless belt between the first and second drums,
wherein
the support has a top side which is arranged by a predetermined distance AL above an upper tangential connecting line of the drum outer surfaces, and
a test stand cover is provided that has a surface which is flush with the top side of the support with the endless belt arranged thereon.

2. The belt unit according to claim 1, wherein the top side of the support has an outwardly curved shape.

3. The belt unit according to claim 1, wherein an end region of the test stand cover, which faces the support, is arranged above the respective drum.

4. The belt unit according to claim 1, wherein a portion of the endless belt, which extends between the drum and the support is arranged between the inner side of the end region and the drum.

5. The belt unit according to claim 1, wherein the free area of the endless belt which is not covered by the test stand cover corresponds substantially to a size of a tire shuffle of a vehicle tire resting on the endless belt, plus a positioning tolerance of the vehicle.

6. The belt unit according to claim 1, wherein the support is a trapezoidal support which consists at least partially of a porous material and to which a fluid, preferably air, is applied.

7. The belt unit according to claim 1, wherein the top side of the support has two slanted first regions and a flat, straight second region which is arranged between the first regions.

8. The belt unit according to claim 7, wherein the radius of a transition is greater than or equal to the minimum allowable bending radius of the endless belt.

9. The belt unit according to claim 7, wherein the radius of a transition is greater than or equal to the radius of the drum.

10. The belt unit according to claim 7, wherein the first regions are shaped as an arc of a circle, wherein the radius is greater than or equal to the minimum allowable bending radius of the endless belt or greater than or equal to the radius of the drum.

11. The belt unit according to claim 7, wherein the first regions are shaped as an arc of a circle, wherein the radius is greater than or equal to the minimum allowable bending radius of the endless belt and greater than or equal to the radius of the drum.

12. The belt unit according to claim 1, wherein the flat second region of the support extends substantially parallel to the upper connecting line.

13. The belt unit according to claim 1, wherein the support has a bottom side with first and second radii, wherein the radii are equal to or greater than the radius of the drums.

14. The belt unit according to claim 1, wherein the test stand cover has a wedge-shaped end region at a side facing at least one of the support or the free region of the endless belt.

15. The belt unit according to claim 14, wherein the wedge-shaped end region has a straight surface which is substantially flush with the top side of the support with an endless belt arranged thereon, has an undersurface which extends in substantially congruent fashion to the slanted first region of the support and the wedge-shaped end region ends substantially in a point towards the support.

16. The belt unit according to claim 1, wherein when a narrow endless belt is used a longitudinal cover plate is arranged in the intermediate space between the drums, wherein the cover plate is arranged in substantially flush fashion with at least one of the top side or outer side of the endless belt running on the flat second region of the support.

17. A wind tunnel balance having a belt unit according to claim 1.

\* \* \* \* \*